Figure 1:
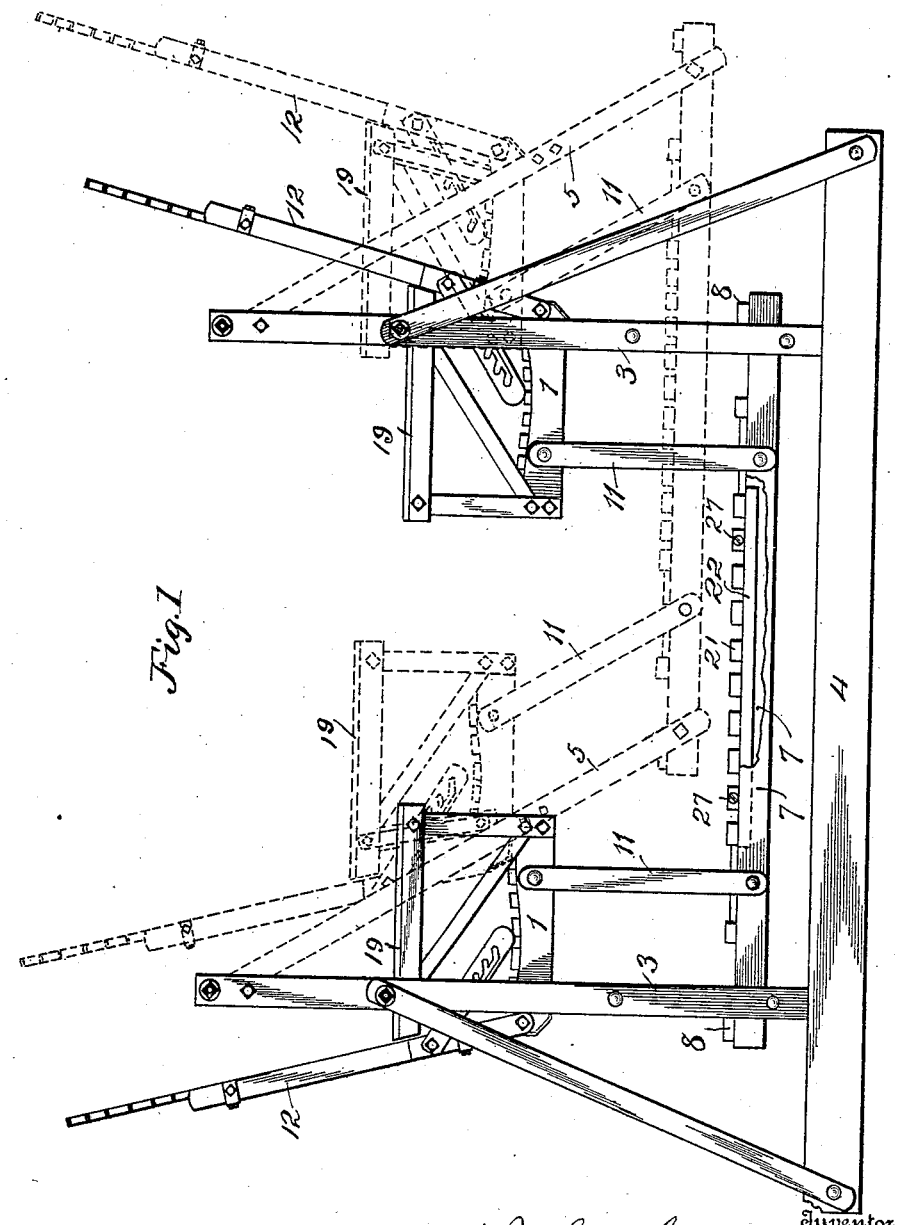

J. C. McVEY.
LAWN SWING.
APPLICATION FILED DEC. 7, 1905.

908,689.

Patented Jan. 5, 1909.
2 SHEETS—SHEET 1.

Witnesses:
R. E. Hamilton.
Wm. C. Single.

Inventor
John C. McVey
By Warren D. House
His Attorney

J. C. McVEY.
LAWN SWING.
APPLICATION FILED DEC. 7, 1905.
908,689.
Patented Jan. 5, 1909.
2 SHEETS—SHEET 2.
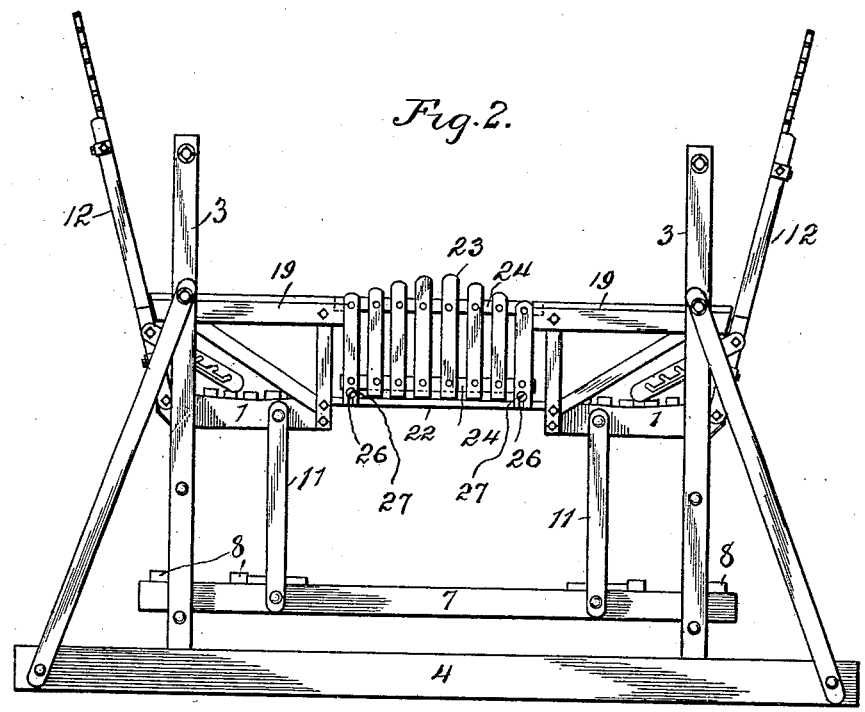
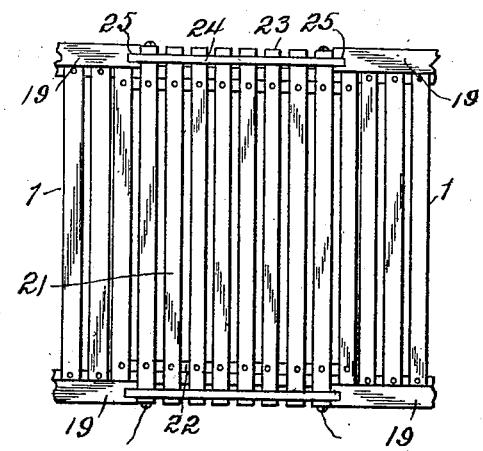
Witnesses:
R. E. Hamilton
Wm. W. Single
Inventor
John C. McVey
By Warren D. House
His Attorney

UNITED STATES PATENT OFFICE.

JOHN C. McVEY, OF KANSAS CITY, MISSOURI.

LAWN-SWING.

No. 908,689.  Specification of Letters Patent.  Patented Jan. 5, 1909.

Application filed December 7, 1905. Serial No. 290,747.

*To all whom it may concern:*

Be it known that I, JOHN C. McVEY, a citizen of the United States, residing at Kansas City, in the county of Jackson and State of Missouri, have invented new and useful Improvements in Lawn-Swings, of which the following is a specification.

My invention relates to improvements in lawn swings.

It relates to the class of lawn swings in which two transverse seats are provided with means for being swung to and fro upon a support.

My invention provides further a lawn swing that may be converted into a crib for infants' use.

Other novel features are hereinafter fully described and claimed.

Figure 1 is a side elevation, the seats and parts connected therewith being shown in dotted lines in the positions occupied by them when swung laterally. Fig. 2 is a side elevation showing the foot rest supported on the seats to form a crib. Fig. 3 is a plan view of a portion of what is shown in Fig. 2.

Similar characters of reference denote similar parts.

1 denotes two seats pivotally supported upon vertical bars 5, which in turn are pivoted at their upper ends to vertical standards 3 forming part of a frame having a horizontal base 4 to which are secured the lower ends of the standards 3.

To the lower ends of the bars 5 are pivoted two horizontal longitudinal bars 7 to which are secured horizontal transverse bars 8, thereby forming a rectangular swinging frame. Four vertical bars 11 are pivoted at their lower ends two to each bar 7, the upper ends of said bars being pivoted respectively to the ends of the seats 1.

12 denotes the seat backs, preferably hinged to the seats, and adapted to be adjusted to different angles relative to the vertical.

A rectangular frame comprising horizontal side bars 22 connected to each other by transverse bars 21 is adapted to be supported upon the bars 7, as shown in Fig. 1. In this position the frame forms a foot rest. To form a crib the frame is moved to the position shown in Fig. 2, the ends of the bars 22 being supported upon the seats 1 between the arms 19 provided at the ends of the seats.

Two side frames are provided, each comprising two horizontal parallel longitudinal bars 24 disposed one above the other, said bars being connected to each other by vertical slats 23. The forward ends of the seat arms 19 are provided each with a vertical notch 25 adapted to receive therein the adjacent end of one of the upper bars 24, as shown in Fig. 3. The lower ends of the end slats 23 are provided each with a notch or slot 26 adapted to receive the projecting end of a horizontal screw 27, of which four are provided, two being mounted in each lateral side of the removable frame.

To form the crib, the foot rest frame, comprising the bars 22 and 21, is removed from the bars 7 and placed upon the seats 1. The side frames comprising the bars 24 and slats 23 are then disposed as shown in Figs. 2 and 3, with the upper bars 24 in the notches 25 and the screws 27 in the notches 26.

Modifications of my invention, within the scope of the appended claims, may be made without departing from its spirit.

Having thus described my invention, what I claim and desire to secure by Letters Patent, is:—

In a lawn swing, the combination with a support, of two seats suspended upon said support, each seat having two end arms having each a vertical notch, seat connecting means, a foot rest for removably being supported on said connecting means and movable to a position in which it will be supported by said seats, said foot rest having at opposite edges two horizontal devices, and two removable side frames each having a horizontal bar adapted to be fitted at its ends in the notches of opposite end arms, each side frame having a vertical slot in its lower edge for receiving the adjacent horizontal device in said foot rest.

In testimony whereof I affix my signature, in presence of two subscribing witnesses.

JOHN C. McVEY.

Witnesses:
 WARREN D. HOUSE,
 HUGH McVEY.